United States Patent
Viola

(10) Patent No.: US 6,283,450 B1
(45) Date of Patent: Sep. 4, 2001

(54) PORTABLE PULLING IRON

(76) Inventor: Al Viola, 127 W. Holly Ave., Oaklyn, NJ (US) 08107

( * ) Notice: Subject to any disclaimer, the term of this patent is extended or adjusted under 35 U.S.C. 154(b) by 0 days.

(21) Appl. No.: 09/753,160

(22) Filed: Dec. 28, 2000

Related U.S. Application Data

(60) Provisional application No. 60/177,743, filed on Jan. 21, 2000.

(51) Int. Cl.[7] .................................................. B65H 59/00
(52) U.S. Cl. ..................................................... 254/134.3 R
(58) Field of Search .................. 254/134.3 R, 134.3 FY, 254/134.5

(56) References Cited

U.S. PATENT DOCUMENTS

| | | | | |
|---|---|---|---|---|
| 1,266,128 | * | 5/1918 | Kelly | 254/134.3 R |
| 2,199,533 | * | 5/1940 | Wuellner | 254/134.3 R |
| 3,916,590 | * | 11/1975 | Miller | 52/125 |
| 4,171,123 | * | 10/1979 | Woelkers | 254/134.3 FT |
| 4,907,782 | * | 3/1990 | Hoekstra | 254/134.3 PA |
| 6,193,217 | * | 2/2001 | Zimmer | 254/134.3 FT |

* cited by examiner

*Primary Examiner*—Derris H. Banks
*Assistant Examiner*—Lee Wilson
(74) *Attorney, Agent, or Firm*—Goldstein Law Offices, P.C

(57) ABSTRACT

A portable pulling iron including a base portion adapted for coupling with respect to a manhole. The base portion includes a pair of opposed vertically oriented segments. Each of the vertically oriented segments has an upper end and a lower end. The vertically oriented segments each have a pair of tabs extending outwardly from the lower ends thereof. Each of the tabs has an aperture therethrough. The upper ends have a horizontal plate extending therebetween. The horizontal plate has a central opening therethrough. The central opening has a support rod extending therein between the upper ends of the vertically oriented segments. An angle iron is secured to the horizontal plate of the base portion. The angle iron is parallel with the vertically oriented segments. A length of chain is provided having opposed free ends secured to the upper ends of the vertically oriented segments of the base portion.

2 Claims, 2 Drawing Sheets

PORTABLE PULLING IRON

CROSS REFERENCES AND RELATED SUBJECT MATTER

This application relates to subject matter contained in provisional patent application Ser. No. 60/177,743, filed in the United States Patent & Trademark Office on Jan. 21, 2000.

BACKGROUND OF THE INVENTION

The present invention relates to a portable pulling iron and more particularly pertains to enabling cable to be extended through a conduit between manholes.

Most of the transit companies in the country are very old. Underground cable is installed through manholes and conduits. Most manholes were constructed with permanent pulling irons between 80 and 100 years ago. Today, most of these permanent pulling irons have decayed to the point where they are unusable. Thus, there is a need for replacement pulling irons which can accomplish these tasks.

The present invention seeks to provide a solution to the abovementioned problem by utilizing a portable pulling iron that can be installed on the floor or wall of the manhole for the attachment of a pulley so cable can be pulled through a conduit between two manholes.

The use of pulling devices is known in the prior art. More specifically, pulling devices heretofore devised and utilized for the purpose of pulling items through underground conduits are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,432,663 to Lasak discloses a cable pulling eye for securing a cable for pulling through an underground conduit. U.S. Pat. No. 4,008,880 to Devis discloses a device for tightening and pulling a wire to facilitate the splicing of broken wires. U.S. Pat. No. 4,171,123 to Woelkers discloses a pulling device comprised of an elongated strip. U.S. Pat. No. 4,443,980 to Pennypacker discloses a pulling iron enclosure.

While these devices fulfill their respective, particular objective and requirements, these patents do not describe a portable pulling iron for enabling cables to be extended through a conduit between manholes.

In this respect, the portable pulling iron according to the present invention substantially departs from the conventional concepts and designs of the prior art, and in doing so provides an apparatus primarily developed for the purpose of enabling cable to be extended through a conduit between manholes.

Therefore, it can be appreciated that there exists a continuing need for a new and improved portable pulling iron which can be used for enabling cable to be extended through a conduit between manholes. In this regard, the present invention substantially fulfills this need.

SUMMARY OF THE INVENTION

In the view of the foregoing disadvantages inherent in the known types of pulling devices now present in the prior art, the present invention provides an improved portable pulling iron. As such, the general purpose of the present invention, which will be described subsequently in greater detail, is to provide a new and improved portable pulling iron which has all the advantages of the prior art and none of the disadvantages.

To attain this, the present invention essentially comprises a base portion adapted for coupling with respect to a manhole. The base portion includes a pair of opposed vertically oriented segments. Each of the vertically oriented segments has an upper end and a lower end. The vertically oriented segments each have a pair of tabs extending outwardly from the lower ends thereof. Each of the tabs has an aperture therethrough. The upper ends have a horizontal plate extending therebetween. The horizontal plate has a central opening therethrough. The central opening has a support rod extending therein between the upper ends of the vertically oriented segments. An angle iron is secured to the horizontal plate of the base portion. The angle iron is parallel with the vertically oriented segments. A length of chain is provided having opposed free ends secured to the upper ends of the vertically oriented segments of the base portion.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved portable pulling iron which has all the advantages of the prior art photo albums and none of the disadvantages.

It is another object of the present invention to provide a new and improved portable pulling iron which may be easily and efficiently manufactured and marketed.

It is a further object of the present invention to provide a new and improved portable pulling iron which is of durable and reliable construction.

An even further object of the present invention is to provide a new and improved portable pulling iron which is susceptible of a low cost of manufacture with regard to both materials and labor, and which accordingly is then susceptible of low prices of sale to the consuming public, thereby making such a portable pulling iron economically available to the buying public.

Even still another object of the present invention is to provide a new and improved portable pulling iron for enabling cable to be extended through a conduit between manholes.

Lastly, it is an object of the present invention to provide a new and improved portable pulling iron including a base portion adapted for coupling with respect to a manhole. The base portion includes a pair of opposed vertically oriented segments. Each of the vertically oriented segments has an upper end and a lower end. The vertically oriented segments each have a pair of tabs extending outwardly from the lower ends thereof. Each of the tabs has an aperture therethrough. The upper ends have a horizontal plate extending therebetween. The horizontal plate has a central opening therethrough. The central opening has a support rod extending therein between the upper ends of the vertically oriented segments. An angle iron is secured to the horizontal plate of the base portion. The angle iron is parallel with the vertically oriented segments. A length of chain is provided having opposed free ends secured to the upper ends of the vertically oriented segments of the base portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
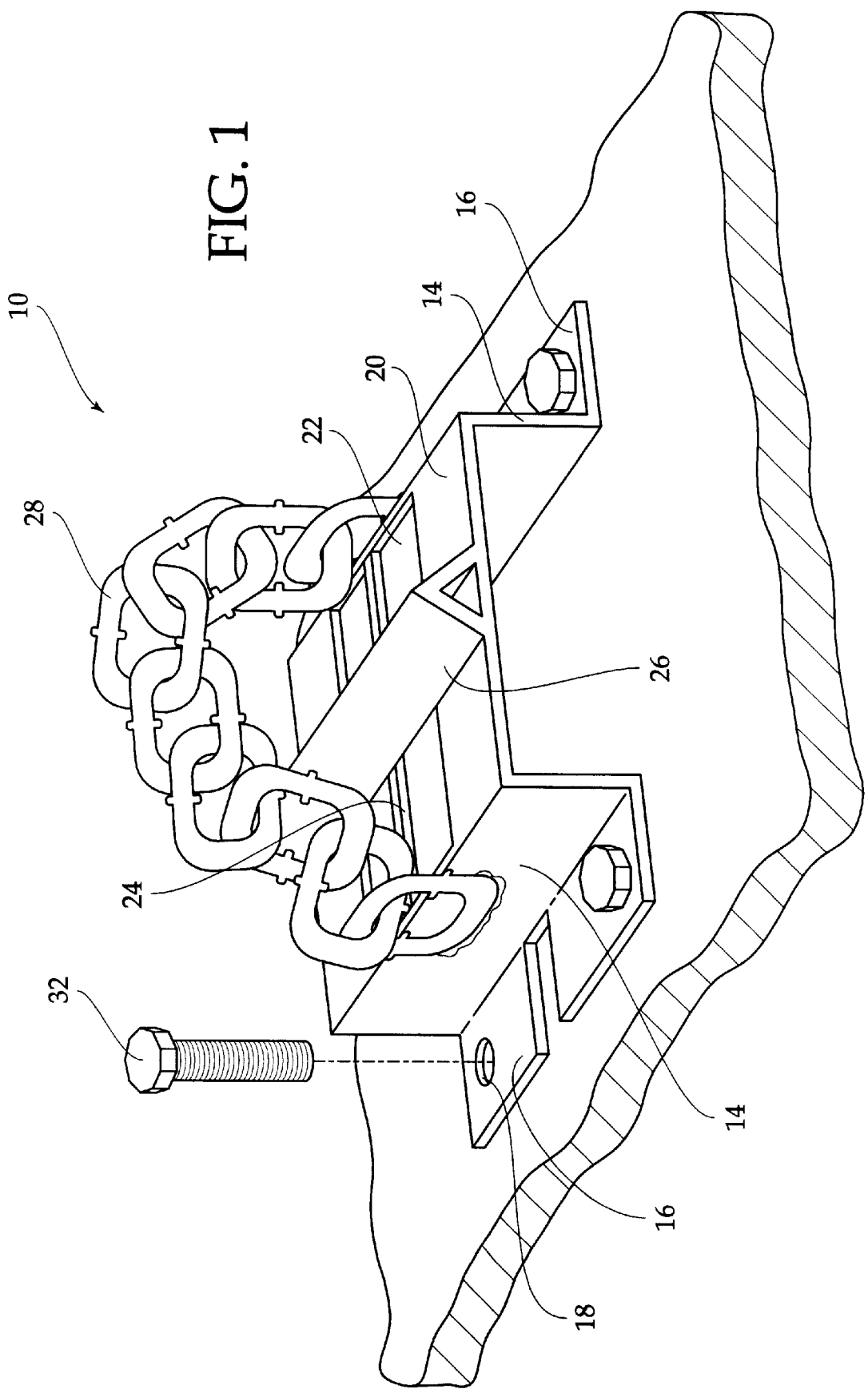
FIG. 1 is a perspective view of the preferred embodiment of the portable pulling iron constructed in accordance with the principles of the present invention.
Figure 2:
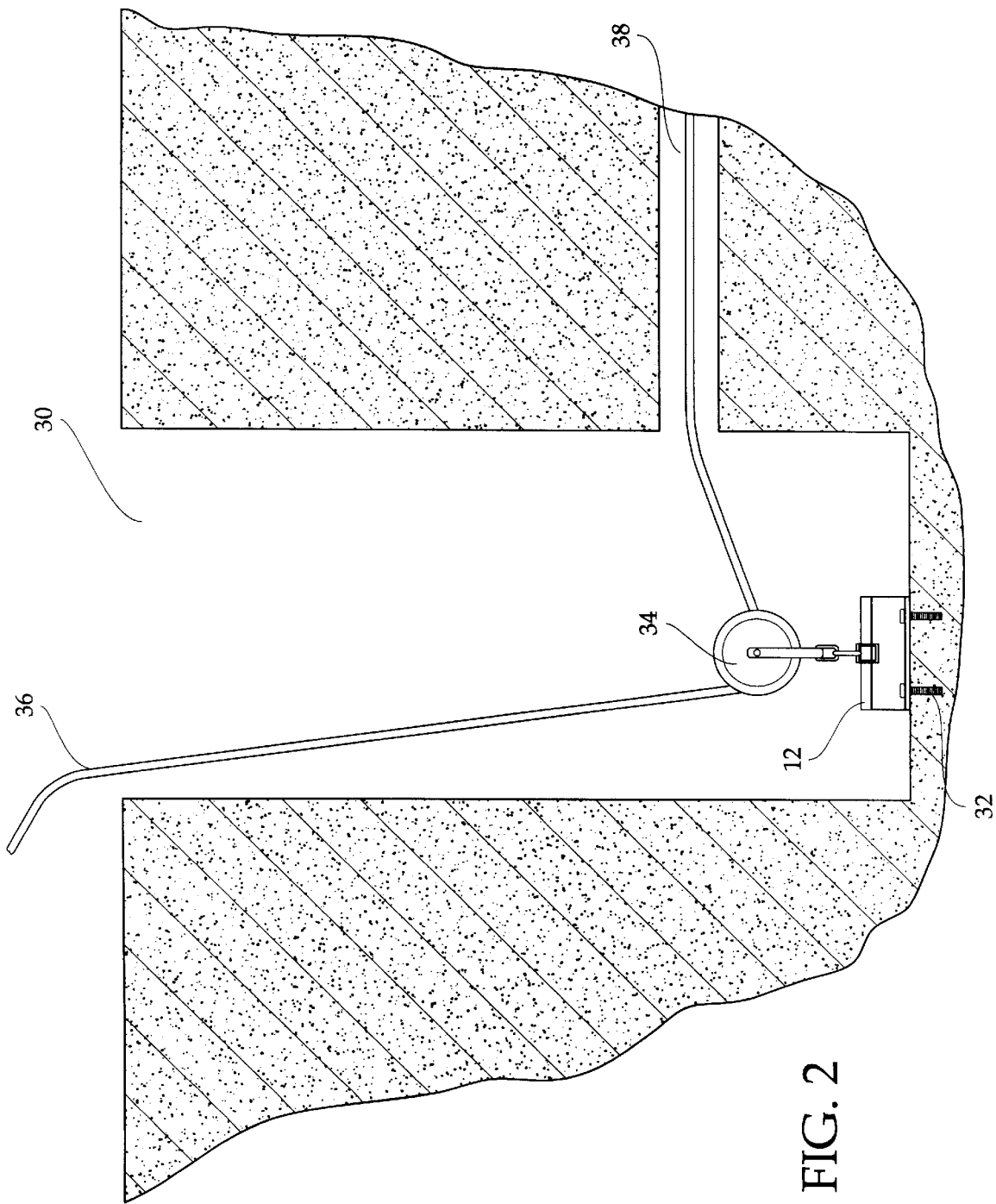
FIG. 2 is a side view of the present invention illustrated extending a length of cable through a conduit between manholes.

With reference now to the drawings, and in particular, to FIGS. 1 and 2 thereof, the preferred embodiment of the new and improved portable pulling iron embodying the principles and concepts of the present invention and generally designated by the reference number 10 will be described.

Specifically, it will be noted in the various Figures that the device relates to a portable pulling iron for enabling cable to be extended through a conduit between manholes. In its broadest context, the device consists of a base portion, an angle iron, and a length of chain. Such components are individually configured and correlated with respect to each other so as to attain the desired objective.

The base portion 12 is adapted for coupling with respect to a manhole. The base portion 12 includes a pair of opposed vertically oriented segments 14. Each of the vertically oriented segments 14 has an upper end and a lower end. The vertically oriented segments 14 each have a pair of tabs 16 extending outwardly from the lower ends thereof. Each of the tabs 16 has an aperture 18 therethrough. The horizontal plate 20 has a central opening 22 therethrough. The central opening 20 has a support rod 24 extending therein between the upper ends of the vertically oriented segments 14.

The angle iron 26 is secured to the horizontal plate 20 of the base portion 12. The angle iron 26 is parallel with the vertically oriented segments 14.

The length of chain 28 has opposed free ends secured to the upper ends of the vertically oriented segments 14 of the base portion 12.

In use, the base portion 12 is secured interiorly of a first of the pair of manholes 30. Note FIG. 2. The securement is facilitated through the use of anchor bolts 32. The base portion 12 can either be secured to wall or floor of the manhole 30. A sheath wheel 34 is then secured to the length of chain 28. A length of cable 36 is next extended into the first manhole 30 and coupled to the sheath wheel 34. The cable 36 is then pulled through the conduit 38 into a second of the pair of manholes. The cable 36 can then be extended outwardly of the second manhole for further use.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A portable pulling iron for enabling cables to be extended through a conduit between manholes comprising, in combination:

a base portion adapted for coupling with respect to a manhole, the base portion including a pair of opposed vertically oriented segments, each of the vertically oriented segments having an upper end and a lower end, the vertically oriented segments each having a pair of tabs extending outwardly from the lower ends thereof, each of the tabs having an aperture therethrough, the upper ends having a horizontal plate extending therebetween, the horizontal plate having a support rod extending therein between the upper ends of the vertically oriented segments;

an angle iron secured to the horizontal plate of the base portion, the angle iron being parallel with the vertically oriented segments;

a length of chain having opposed free ends secured to the upper ends of the vertically oriented segments of the base portion.

2. A method of pulling cable through a conduit between a pair of manholes comprising, in combination;

providing a base portion including a pair of opposed vertically oriented segments, each of the vertically oriented segments having an upper end and a lower end, the vertically oriented segments each having a pair of tabs extending outwardly from the lower ends thereof, each of the tabs having an aperture therethrough, the upper ends having a horizontal plate extending therebetween, the horizontal plate having a central opening therethrough, the central opening having a support rod extending therein between the upper ends of the vertically oriented segments;

providing an angle iron for securement to the horizontal plate of the base portion, the angle iron being parallel with the vertically oriented segments;

providing a length of chain having opposed free ends for securement to the upper ends of the vertically oriented segments of the base portion;

securing the base portion interiorly of a first of the pair of manholes;

securing a sheath wheel to the length of chain;

extending a length of cable into the first manhole and coupling to the sheath wheel;

pulling the cable through the conduit into a second of the pair of manholes;

extending the cable outwardly of the second manhole.

* * * * *